(12) United States Patent
Menard

(10) Patent No.: US 6,731,354 B2
(45) Date of Patent: May 4, 2004

(54) LIQUID CRYSTAL DISPLAY MOUNT INCLUDING A FRAME HAVING STRESS RELIEF RECESS

(75) Inventor: Jean Pierre Menard, Fremont, CA (US)

(73) Assignee: Aurora Systems, Inc., San Jose, CA (US)

( * ) Notice: Subject to any disclaimer, the term of this patent is extended or adjusted under 35 U.S.C. 154(b) by 0 days.

(21) Appl. No.: 09/816,831

(22) Filed: Mar. 22, 2001

(65) Prior Publication Data

US 2002/0135712 A1 Sep. 26, 2002

(51) Int. Cl.⁷ .................. G02F 1/1333; G03B 21/14
(52) U.S. Cl. ........................... 349/58; 353/119
(58) Field of Search ..................... 349/58; 353/119

(56) References Cited

U.S. PATENT DOCUMENTS

| | | | |
|---|---|---|---|
| 5,212,595 A | 5/1993 | Dennison, Jr. et al. | 359/513 |
| 5,249,082 A | 9/1993 | Newman | 359/813 |
| 5,442,470 A | 8/1995 | Hashimoto | 359/83 |
| 5,486,942 A | 1/1996 | Ichikawa et al. | 359/83 |
| 5,515,188 A | 5/1996 | Miles et al. | 359/62 |
| 5,523,893 A | 6/1996 | Haas | 359/820 |
| 5,764,314 A | 6/1998 | Narayan et al. | 349/58 |
| 5,798,879 A | 8/1998 | Salvio | 359/857 |
| 5,868,485 A | 2/1999 | Fujimori et al. | 353/119 |
| 5,969,783 A | 10/1999 | Takiar et al. | 349/150 |
| 5,988,818 A | 11/1999 | Fujimori et al. | 353/119 |
| 6,307,603 B1 * | 10/2001 | Menard et al. | 349/57 |

* cited by examiner

Primary Examiner—Tarifur R. Chowdhury
(74) Attorney, Agent, or Firm—Henneman & Saunders; Larry E. Henneman, Jr.

(57) ABSTRACT

An improved imager assembly (10) having an imager subassembly (11) with an LCD device (14) mounted on a substrate (12) with a connector ribbon electrically and mechanically attached thereto. An improved mounting frame (20) has a plurality of mounting screw holes (36). A plurality of stress reducing recesses (28) prevent stress from being transferred though an isolation border (26) of the mounting frame (20) to the LCD device (14). An image mask (22) is affixed to the mounting frame (20) by an adhesive (24) and the adhesive (24) is further used to affix the mounting frame (20) to the imager subassembly (11).

23 Claims, 3 Drawing Sheets

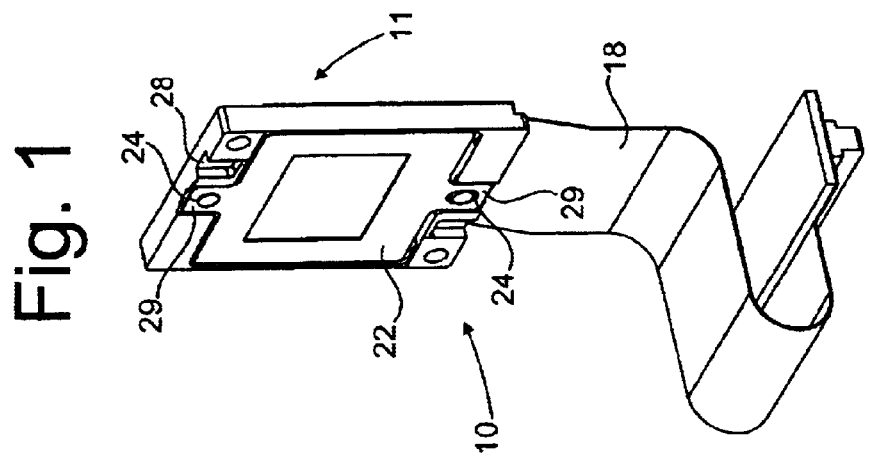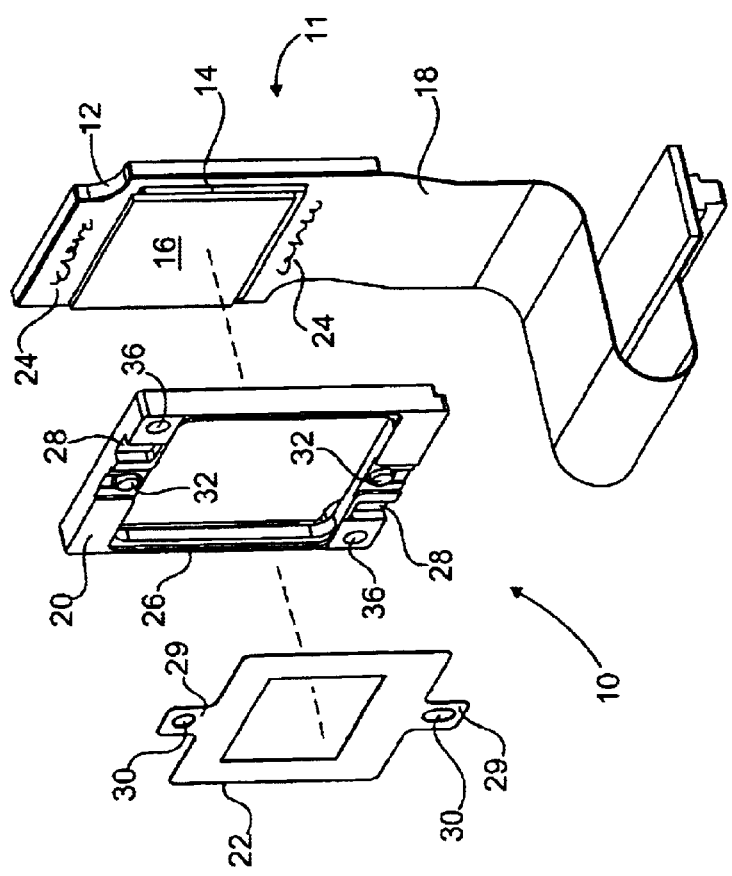

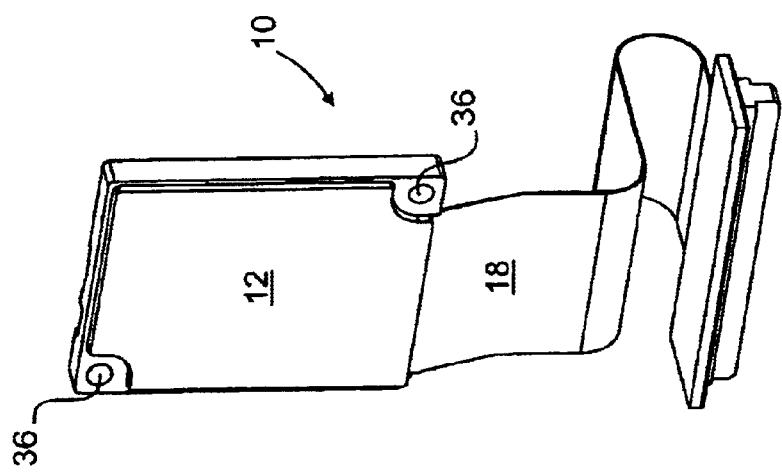
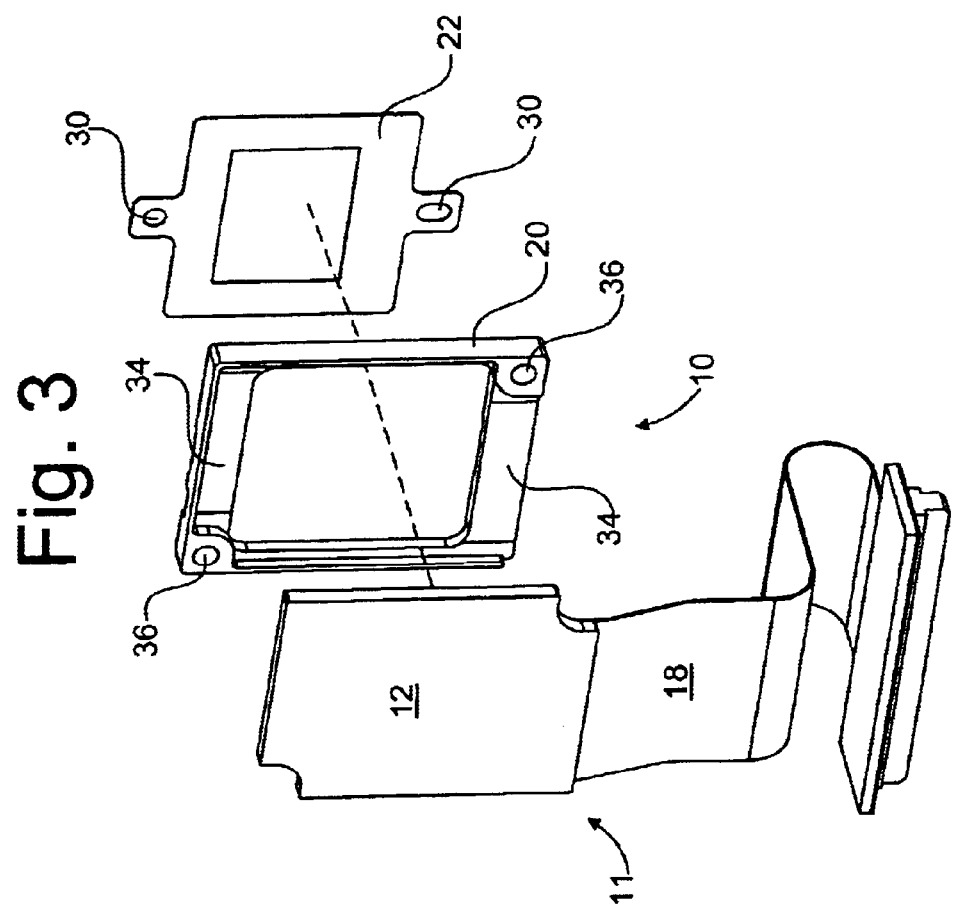

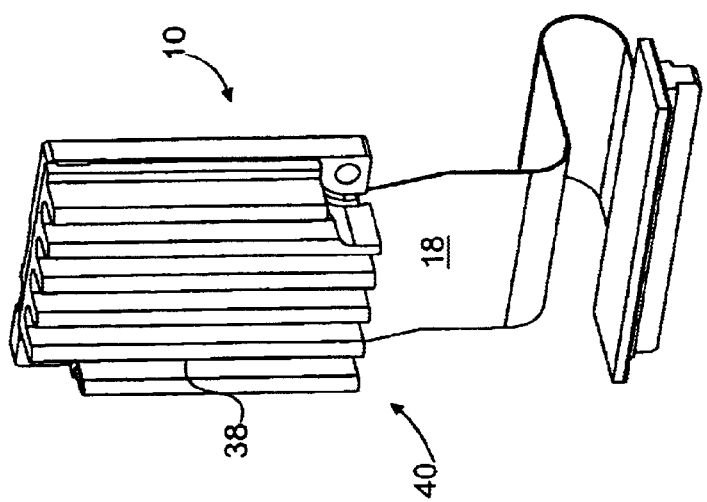
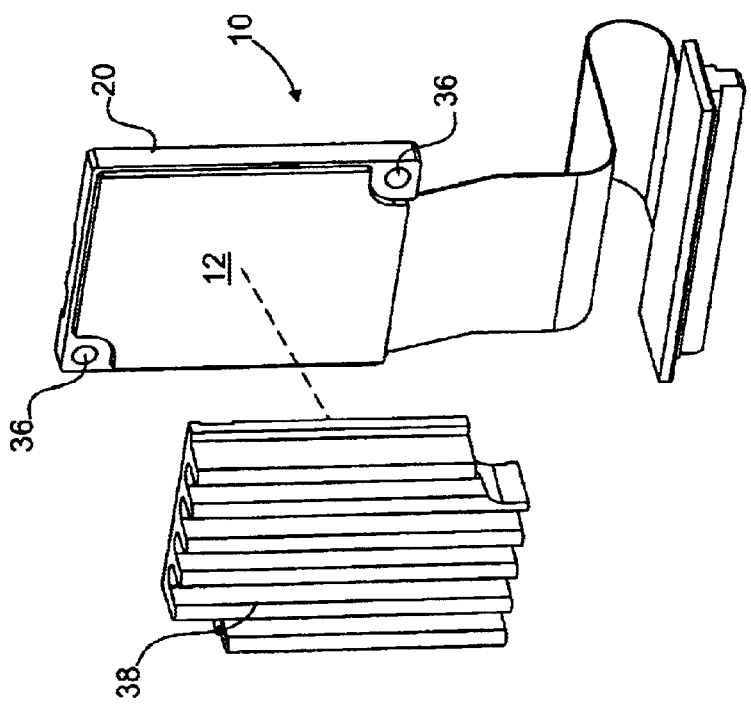

LIQUID CRYSTAL DISPLAY MOUNT INCLUDING A FRAME HAVING STRESS RELIEF RECESS

TECHNICAL FIELD

The present invention relates to the field of electronic imaging devices, and more particularly to a method and apparatus for precision mounting of an imaging device such as a liquid crystal display ("LCD") imaging device. The predominant current usage of the inventive precision surface mount is in the surface mounting of reflective imaging devices in a multi channel projection system, wherein it is particularly important to maintain a precise relationship between a reflective surface of the LCD and a mounting surface.

BACKGROUND ART

Projection type imaging devices commonly use micro LCD imagers. Since the pixel size and spacing on these imagers are so small, they must be precisely placed in relation to surface whereon they are mounted. Further, the imager must be kept perfectly flat, since even the slightest distortion of the imager will result in a portion of the imager's pixels being out of the focal plane and/or out of alignment. Moreover, it is important to maintain the flatness of the imaging device in order to maintain uniformity of the focal plane and to enhance convergence with other such devices in the system.

Prior art mechanical attachment methods and means have secured the imager in position. However, it has been found that such prior art mechanical attachment methods will place stress on the imager which tends to cause the imager to be less than perfectly flat. It would be advantageous to have some method or means to mount such an imager, or other video display device, wherein there would be no such unwanted forces on the imager. U.S. patent application Ser. No. 09/483,889, in the name of this present inventor, describes and claims an low stress mounting apparatus. To the inventor's' knowledge, no other prior method or apparatus has existed which will consistently result in the precise placement of micro LCD imaging devices without causing the imaging device to at least tend toward a distorted condition. All previous methods have required some sort of rigid mechanical attachment in order to maintain the precise placement needed for such devices. This present invention provides a more compact, less expensive and otherwise improved solution for achieving many of the same objectives addressed by the inventor's prior invention.

SUMMARY

Accordingly, it is an object of the present invention to provide a method and apparatus for mounting an imaging device which does not put any stress on the imaging device which might tend to deflect it and cause some distortion from its flat, unstressed condition.

It is another object of the present invention to provide a method and apparatus for mounting an imaging device which will hold the imaging device securely such that it is resistant to vibration and other external forces.

It is still another object of the present invention to provide a method and apparatus for mounting an imaging device which is easy and inexpensive to implement in a production environment.

It is yet another object of the present invention to provide a method and apparatus for mounting an imaging device which will result in a clearly focused image across the entire surface of the imaging device.

Briefly, the present invention is an apparatus for holding an LCD reflective imaging device in such a way that there is no stress induced on the device when it is attached to a mount. A frame is provided which has recesses for reducing stress therein. The frame is constructed so as to be attached with only two screws, thereby reducing the potential for introducing stress into the frame when tightening the screws. The improved liquid crystal display mount is affixed to an imager assembly by an adhesive, and an image mask is further affixed to the frame by an adhesive. The design of the present improved liquid crystal display mount provides a surface whereto a heat sink can optionally be affixed.

An advantage of the present invention is an image is produced which is in focus in all areas of the image.

Another advantage of the present invention is that an imaging device can be mounted such that the imaging device is not distorted out of shape.

Still another advantage of the present invention is that an imaging device can be readily mounted in a production environment without damaging or stressing the image device.

Yet another advantage of the present invention is that it is easy and inexpensive to implement.

Still another advantage of the present invention is that an imaging device is securely mounted.

Yet another advantage of the present invention is that it is simple and inexpensive to manufacture and to use.

Still another advantage of the present invention is that even less stress is introduced to an imaging device than in prior low stress devices.

Yet another advantage of the present invention is that a heat sink can optionally be mounted to an imager without introducing significant stress thereto.

These and other objects and advantages of the present invention will become clear to those skilled in the art in view of the description of modes of carrying out the invention, and the industrial applicability thereof, as described herein and as illustrated in the several figures of the drawing. The objects and advantages listed are not an exhaustive list of all possible advantages of the invention. Moreover, it will be possible to practice the invention even where one or more of the intended objects and/or advantages might be absent or not required in the application.

Further, those skilled in the art will recognize that various embodiments of the present invention may achieve one or more, but not necessarily all, of the above described objects and advantages. Accordingly, the listed advantages are not essential elements of the present invention, and should not be construed as limitations.

BRIEF DESCRIPTION OF THE DRAWINGS

FIG. 1 is perspective view of an assembled imager, according to the present invention;

FIG. 2 is an exploded perspective view of the imager of FIG. 1;

FIG. 3 is an exploded perspective view showing the imager of FIG. 2 from a reverse perspective;

FIG. 4 is a reverse perspective view of the assembled imager of FIG. 1;

FIG. 5 is a partially exploded perspective view showing a heat sink in relation to the assembled imager of FIG. 4; and FIG. 6 is a perspective view of the imager of FIGS. 4 and 5 with a heat sink assembled thereto.

DETAILED DESCRIPTION

The embodiments and variations of the invention described herein, and/or shown in the drawings, are presented by way of example only and are not limiting as to the scope of the invention. Unless otherwise specifically stated, individual aspects and components of the invention may be omitted or modified, or may have substituted therefore known equivalents, or as yet unknown substitutes such as may be developed in the future or such as may be found to be acceptable substitutes in the future. The invention may also be modified for a variety of applications while remaining within the spirit and scope of the claimed invention, since the range of potential applications is great, and since it is intended that the present invention be adaptable to many such variations.

A known mode for carrying out the invention is an improved liquid crystal imager assembly. The inventive imager assembly is depicted in a perspective view in FIG. 1 and in an exploded perspective view in FIG. 2, and is designated therein by the general reference character 10. The liquid crystal display assembly 10 has an imager subassembly 11 having a metal substrate 12 with a reflective LCD device 14 affixed thereto. The LCD device 14 will be familiar to one skilled in the art as including the silicon on which the circuitry and light reflecting portions of the imager assembly 10 are located. A glass cover 16 protects the LCD device 14 and provides a transparent medium through which light is transmitted. A connector ribbon 18 provides a means for electrically connecting the improved imager assembly 10. The imager subassembly 11 is not greatly different in kind from other such known subassemblies.

According to the presently described embodiment of the improved imager assembly 10, an improved mounting frame 20 and an image mask 22 are assembled to the imager subassembly 11 as described hereinafter. As can be seen in the view of FIG. 2, an adhesive 24 is applied to the imager subassembly 11 to adhere the mounting frame 20 thereto. Using a compliant adhesive (an adhesive that remains flexible even after it is cured) for adhesive 24 further isolates imager subassembly 11 from mounting stresses. As depicted in the view of FIG. 1, a dab of the adhesive 24 is also placed on the alignment tabs 29 of the image mask 22 to affix the image mask 22 to the mounting frame 20 after the image mask 22 is positioned on the mounting frame 20.

As can be seen in the views of FIGS. 1 and 2, the image mask 22 has a pair of attachment tabs 29, each of which has an index hole 30 in the embodiment depicted. The index holes 30 are adapted to fit over a pair of index posts 32 on the mounting frame 20. It should be noted that the index holes 30 and index tabs 32 are optional and are, indeed, not present in one presently known embodiment of the invention.

According to the presently described embodiment 10 of the invention, an isolation border 26 of the mounting frame 20 has a plurality (two, in this present example) of stress reducing recesses 28 which allow the isolation border 26 to flex at such locations. The quantity and position of the stress reducing recesses 28 may vary with the particular application of the invention.

FIG. 3 is an exploded perspective view of the improved imager assembly 10 shown from the back, as compared to the view of FIG. 2. FIG. 4 is a perspective view of the improved imager assembly 10 shown from the back, as compared to the view of FIG. 1. In the view of FIG. 3 it can be seen that the mounting frame 20 has a plurality (two, in the present example) of lands 34 for accepting the adhesive 24 (FIG. 2) whereby the mounting frame 20 is affixed to the imager subassembly 11. Also visible in the views of FIGS. 3 and 4 are a plurality (two, in this present example) of mounting screw holes 36 through which mounting screws (not shown) may be passed to affix the improved imager assembly 10 to a housing (not shown). According to the present invention, it is thought that reducing the quantity of mounting screw holes 36 (to the quantity of two, as in the presently described example) will reduce the potential for stress being passed on therefrom to the imager subassembly 11.

FIG. 5 is an exploded perspective view showing a heat sink 38 positioned in relation to the improved imager assembly 10. FIG. 6 is perspective view of an assembly with heat sink 40 wherein the heat sink 38 is positioned on the improved imager assembly 10. The heat sink 38 should not be affixed rigidly to the improved imager assembly 10, because differential heat expansion therebetween might introduce stress which would cause the LCD device 14 to change shape. Therefore, it is thought that the heat sink 38 can be affixed, if desired, to the imager assembly 10 by a metal clip, rubber band, or the like. Further, it would be desirable to use a heat transfer gel (or the like) between the heat sink 38 and the improved imager assembly 10. It should be noted that the heat sink 38 is not used in the present current embodiment of the invention. Rather, the heat sink 38 is a possible variation which might be used in the future.

Various modifications may be made to the invention without altering its value or scope. For example, the size, shape, and placement of components described herein may each or all be varied according to the requirements of the particular application.

All of the above are only some of the examples of available embodiments of the present invention. Those skilled in the art will readily observe that numerous other modifications and alterations may be made without departing from the spirit and scope of the invention. Accordingly, the disclosure herein is not intended as limiting and the appended claims are to be interpreted as encompassing the entire scope of the invention.

INDUSTRIAL APPLICABILITY

The inventive improved imager assembly 10 is intended to be widely used in the construction of projection type imaging devices. Currently, the invention is being applied to the construction of multi channel imaging devices using reflective type LCD devices such that three of the improved imager assemblies 10 are employed in each such device. However, it is within the scope of the invention that other types of display devices (not shown) could be employed (e.g., deformable mirror devices, etc.), and other types of imaging engines constructed, according to the present inventive method.

The inventors have discovered that application of the present invention provides for an imager assembly 10 wherein there is no detectable distortion transferred to the LCD device 14 from the mounting stresses. This means that there was less than 20 nanometers of deflection induced on the LCD device 14. The inventive mounting frame 20 effectively decouples the LCD device 14 from the mechanical stresses induced from mounting the device at the system integration level.

According to the present invention, the imaging aperture mask 22 can be aligned to the active area on the LCD device 14 to a high degree of accuracy. According to the present invention, convergence to sub-pixel accuracy over the entire image is made possible.

Since the improved imager assemblies 10 of the present invention may be readily produced and integrated with existing video creation and display systems and devices, and since the advantages as described herein are provided, it is expected that it will be readily accepted in the industry. For these and other reasons, it is expected that the utility and industrial applicability of the invention will be both significant in scope and long-lasting in duration.

I claim:

1. A display device assembly, comprising:

an imager device affixed to a substrate; and a mounting border adapted for accepting the substrate, the mounting border having at least one corner and at least one stress relief recess disposed between said corner and the midpoint of an edge adjacent said corner.

2. The display device assembly of claim 1, wherein:

said mounting border includes a plurality of mounting screw apertures.

3. The display device of claim 2, wherein:

the quantity of said mounting screw apertures is no more than two.

4. The display device assembly of claim 1, wherein:

the substrate is affixed to the mounting border by an adhesive.

5. The display device of claim 4, wherein:

said adhesive is a compliant adhesive.

6. The display device assembly of claim 1, and further including:

an aperture mask affixed to the mounting border.

7. The display device assembly of claim 6, wherein:

the aperture mask is affixed to the mounting border with an adhesive.

8. The display device assembly of claim 1, and further including:

a flexible cable and connector assembly affixed to the substrate.

9. The display device assembly of claim 1, wherein:

the mounting border is generally rectangular in shape;

the mounting border includes at least one mounting screw hole; and the mounting screw hole is isolated from a main body of the mounting border by at least one of the stress relief recesses.

10. The display device assembly of claim 9, wherein the mounting screw hole is disposed within the rectangular perimeter of said mounting border.

11. The display device assembly of claim 1, wherein:

said stress relief recess is positioned immediately adjacent to a mounting screw aperture.

12. A mounting frame for mounting an imager subassembly, comprising:

a main body adapted for accepting the imager subassembly;

at least one mounting hole adapted for securing the mounting frame therethrough; and a stress relief recess for at least partially isolating the main body from the mounting hole, said stress relief recess being dispnosed a distance not greater than one-fourth of the width of said main body from said mounting hole.

13. The mounting frame of claim 12, wherein:

the mounting frame includes no more than two mounting holes and no more than two stress relief recesses.

14. The mounting frame of claim 13, wherein:

said mounting frame is shaped as a polygon; and said two mounting holes and said two stress relief recesses lie within the perimeter of said polygon.

15. The mounting frame of claim 12, wherein:

the imager subassembly is affixed to the mounting frame using an adhesive.

16. The mounting frame of claim 12, wherein:

the stress relief recess is located immediately adjacent to a mounting screw hole.

17. The mounting frame of claim 12, wherein:

the mounting frame has two mounting screw holes and two stress relief apertures.

18. The mounting frame of claim 12, wherein:

the mounting frame has at least one land for accepting adhesive for securing the imager subassembly thereto.

19. A mounting device for accepting an imaging device, comprising:

a frame having a recess formed in a rear surface of the frame for accepting the imaging device;

at least one stress relief recess formed in a front surface of the frame, said stress relief recess not passing entirely through the frame; and at least one screw hole through the frame.

20. The mounting device of claim 19, and further including:

an image mask affixed to the frame in a mask receiving recess formed in the front surface of the frame.

21. The mounting device of claim 20, wherein:

said frame is shaped as a polygon; and said screw holes and said stress relief recesses lie within the perimeter of said polygon.

22. The mounting device of claim 19, wherein:

the mask receiving recess defines an alignment post over which the image mask is positioned: and the image mask is affixed to the frame with an adhesive.

23. The mounting device of claim 19, wherein:

the quantity of screw holes is two;

the quantity of stress relief recesses is two; and each of the stress relief recesses is positioned generally adjacent to one of the screw holes.

* * * * *

UNITED STATES PATENT AND TRADEMARK OFFICE
CERTIFICATE OF CORRECTION

PATENT NO. : 6,731,354 B2
DATED : May 4, 2004
INVENTOR(S) : Menard

It is certified that error appears in the above-identified patent and that said Letters Patent is hereby corrected as shown below:

<u>Column 6,</u>
Line 5, delete "disnosed" and insert -- disposed -- in its place.

Signed and Sealed this

Thirteenth Day of September, 2005

JON W. DUDAS
*Director of the United States Patent and Trademark Office*